United States Patent
Vargantwar et al.

(10) Patent No.: US 8,229,477 B1
(45) Date of Patent: Jul. 24, 2012

(54) MULTIPLE PAGING CHANNELS IN WIRELESS COMMUNICATION SYSTEMS

(75) Inventors: Sachin R. Vargantwar, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 183 days.

(21) Appl. No.: 12/701,382

(22) Filed: Feb. 5, 2010

(51) Int. Cl.
*H04W 68/00* (2009.01)

(52) U.S. Cl. ........................................ 455/458

(58) Field of Classification Search .................. 455/458
See application file for complete search history.

(56) References Cited

U.S. PATENT DOCUMENTS

| | | | |
|---|---|---|---|
| 6,507,743 B1 | 1/2003 | Abrishamkar et al. | |
| 6,650,912 B2 | 11/2003 | Chen et al. | |
| 6,771,616 B2 | 8/2004 | Abrishamkar et al. | |
| 6,829,485 B2 | 12/2004 | Abrishamkar et al. | |
| 6,895,058 B2 | 5/2005 | Abrishamkar et al. | |
| 2001/0044313 A1 | 11/2001 | Abrishamkar | |
| 2003/0152049 A1 | 8/2003 | Turner | |
| 2005/0090277 A1* | 4/2005 | Islam et al. | 455/525 |
| 2006/0176870 A1 | 8/2006 | Joshi et al. | |
| 2006/0182069 A1* | 8/2006 | Yu | 370/335 |
| 2007/0072643 A1 | 3/2007 | Jiang et al. | |
| 2007/0097922 A1 | 5/2007 | Parekh et al. | |
| 2007/0258436 A1 | 11/2007 | Kulkarni et al. | |
| 2008/0051109 A1* | 2/2008 | Willey | 455/458 |
| 2008/0198811 A1 | 8/2008 | Deshpande et al. | |
| 2009/0124204 A1* | 5/2009 | Howard et al. | 455/59 |
| 2009/0141689 A1 | 6/2009 | Parekh et al. | |
| 2009/0233605 A1* | 9/2009 | Kim | 455/436 |
| 2009/0279503 A1* | 11/2009 | Chin et al. | 370/331 |
| 2010/0036737 A1* | 2/2010 | Shenfield et al. | 705/14.59 |
| 2010/0220636 A1* | 9/2010 | Chan | 370/277 |
| 2011/0039529 A1* | 2/2011 | Kim et al. | 455/418 |
| 2011/0103381 A1* | 5/2011 | Chaudry et al. | 370/389 |

OTHER PUBLICATIONS

U.S. Appl. No. 12/730,750, filed Mar. 24, 2010.
U.S. Appl. No. 12/758,190, filed Apr. 12, 2010.
U.S. Appl. No. 12/765,160, filed Apr. 22, 2010.

* cited by examiner

*Primary Examiner* — Nathan Mitchell

(57) ABSTRACT

What is disclosed is a method of operating a wireless access node in a communication system. The method includes, in the wireless access node, exchanging first wireless communications with a first set of user devices using a first communication mode that has a first paging channel, and exchanging second wireless communication with a second set of user devices using a second communication mode that has a second paging channel. The method also includes, in the wireless access node, transmitting a first bit sequence to indicate the presence of first pages on the first paging channel, and transmitting a second bit sequence to indicate the presence of second pages on the second paging channel.

18 Claims, 6 Drawing Sheets

MULTIPLE PAGING CHANNELS IN WIRELESS COMMUNICATION SYSTEMS

TECHNICAL FIELD

Aspects of the disclosure are related to the field of communications, and in particular, paging channels in wireless communication systems.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications between user devices and a core network of the wireless communication system over backhaul communication links to control nodes.

The wireless communication system also typically transfers information to the user devices to indicate incoming voice calls, text messages, network alerts, or other alerts and messages. This information, often referred to as pages, is routed through the wireless access nodes to reach the user devices via a paging channel. Indicators of available pages are sometimes shared by many user devices.

Overview

What is disclosed is a method of operating a wireless access node in a communication system. The method includes, in the wireless access node, exchanging first wireless communications with a first set of user devices using a first communication mode that has a first paging channel, and exchanging second wireless communication with a second set of user devices using a second communication mode that has a second paging channel. The method also includes, in the wireless access node, transmitting a first bit sequence to indicate the presence of first pages on the first paging channel, and transmitting a second bit sequence to indicate the presence of second pages on the second paging channel.

What is also disclosed is a wireless access node in a communication system. The wireless access node includes a first communication interface configured to exchange first wireless communications with a first set of user devices using a first communication mode that has a first paging channel, and a second communication interface configured to exchange second wireless communication with a second set of user devices using a second communication mode that has a second paging channel. The first communication interface is also configured to transmit a first bit sequence to indicate the presence of first pages on the first paging channel, and the second communication interface is also configured to transmit a second bit sequence to indicate the presence of second pages on the second paging channel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
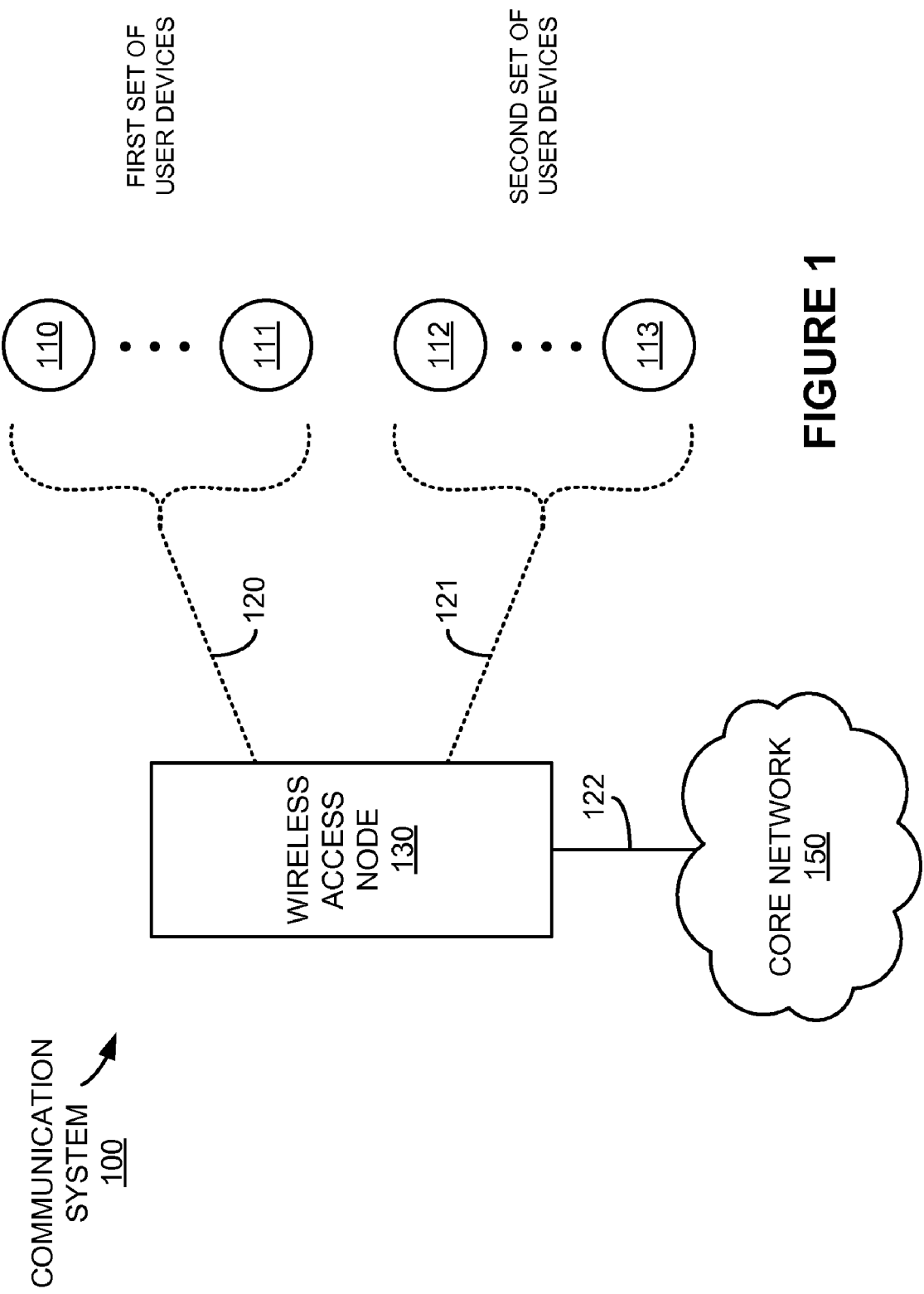
FIG. 1 is a system diagram illustrating a communication system.

FIG. 1 is a system diagram illustrating communication system 100. Communication system 100 includes user devices 110-113, wireless access node 130, and core network 150. User devices 110-111 are included in a first set of user devices, and user devices 112-113 are included in a second set of user devices, as shown in FIG. 1. The first set of user devices 110-111 and wireless access node 130 communicate over wireless link 120. The second set of user devices and wireless access node 130 communicate over wireless link 121. Wireless access node 130 and core network 150 communicate over link 122.

In the example shown in FIG. 1, user devices are grouped into two sets, although other configurations could be employed. Each set is shown to communicate with wireless access node 130 over a single wireless link. In this example, each of wireless links 120-121 is representative of a wireless access communication mode. For example, the first set of user devices 110-111 could receive wireless access from wireless access node 130 using a first communication mode, and the second set of user device 112-113 could receive wireless access from wireless access node 130 using a second communication mode. A communication mode could comprise a wireless protocol, and include paging channels according to the wireless protocol. The first communication mode and the second communication mode could each include similar or different wireless communication modes, such as protocols, channels, frequencies, timeslots, spreading codes, or other communication modes. In other examples, separate wireless links could be shown for each user device, with portions of the separate wireless links shared between user devices and used for communication sessions and associated overhead communications.

Wireless access node 130 typically transfers information to the user devices to indicate incoming voice calls, text messages, network alerts, or other alerts and messages. This information, often referred to as pages, is routed through wireless access node 130 to reach the user devices via paging channels. Indicators of available pages are sometimes shared by many user devices. However, since the paging indicators can be shared, a page may or may not be available for every user device of the set.

Figure 2:
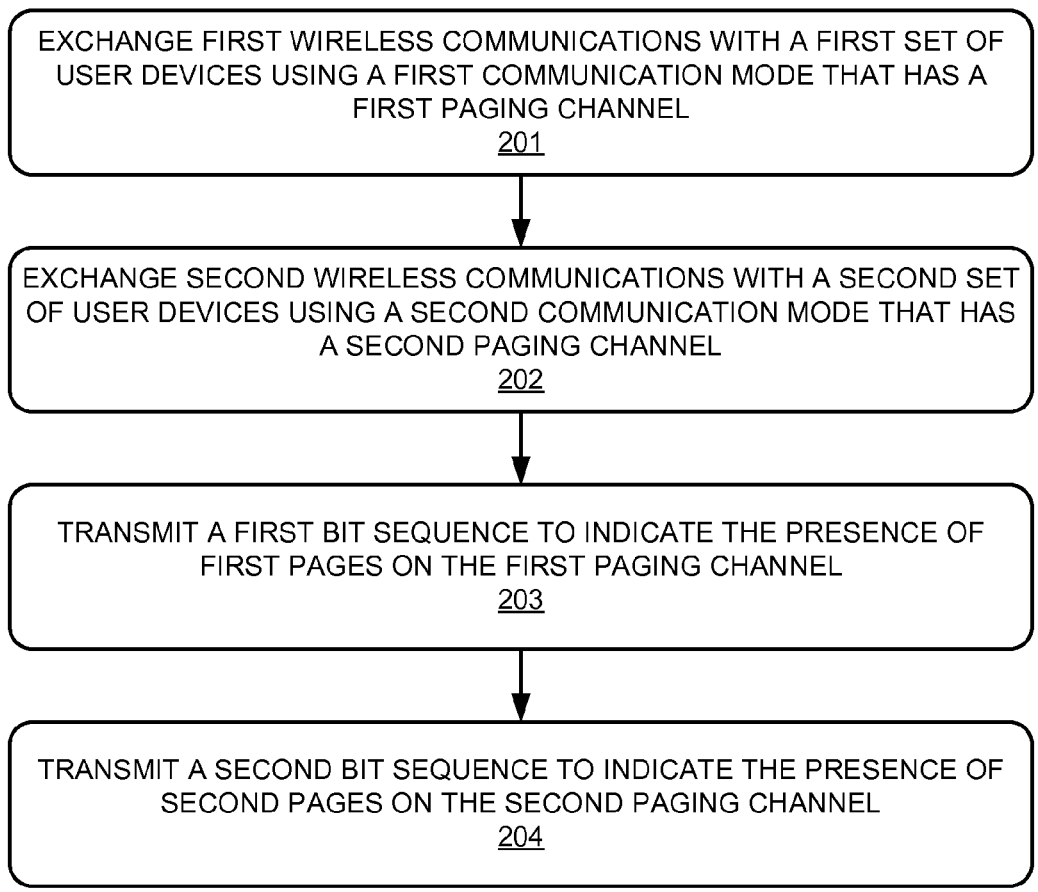
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless access node 130 exchanges (201) first wireless communications with a first set of user devices using a first communication mode that has a first paging channel. In this example, the first set of user devices includes user devices 110-111. The first communication mode could comprise a first wireless protocol, and include a first paging channel according to the first wireless protocol. The first paging channel is included in wireless link 120 as shown FIG. 1. Wireless access node 130 exchanges (202) second wireless communications with a second set of user devices using a second communication mode that has a second paging channel. In this example, the second set of user devices includes user devices 112-113. The second communication mode could comprise a second wireless protocol, and include a second paging channel according to the second wireless protocol. The second paging channel is included in wireless link 121 as shown in FIG. 1. The first paging channel and the second paging channel each include pages or other paging information for user devices, and wireless links 120-121 could each include further paging channels.

Wireless access node 130 transmits (203) a first bit sequence using the first communication mode to indicate the presence of first pages on the first paging channel. In this example, the first bit sequence is transmitted over wireless link 120 for receipt by user devices 110-111 of the first set of user devices. In further examples, the first bit sequence is provided over a quick paging channel (QPCH) of wireless link 120, although other configurations could be used. In typical examples, the user devices in the first set of user devices, such as user devices 110-111, share and monitor the first bit sequence or a bit in the first bit sequence. If the first bit sequence indicates a page is present on the first paging channel, then user devices 110-111 would both check for a page on the first paging channel. Wireless access node 130 transmits (204) a second bit sequence to indicate the presence of second pages on the second paging channel. In this example, the second bit sequence is transmitted over wireless link 121 for receipt by user devices 112-113 of the second set of user devices. In further examples, the second bit sequence is provided over a quick paging channel (QPCH) of wireless link 121, although other configurations could be used. In typical examples, the user devices in the second set of user devices, such as user devices 112-113, share and monitor the second bit sequence or a bit of the second bit sequence. If the second bit sequence indicates a page is present on the second paging channel, then user devices 112-113 would both check for a page on the second paging channel.

Figure 3:
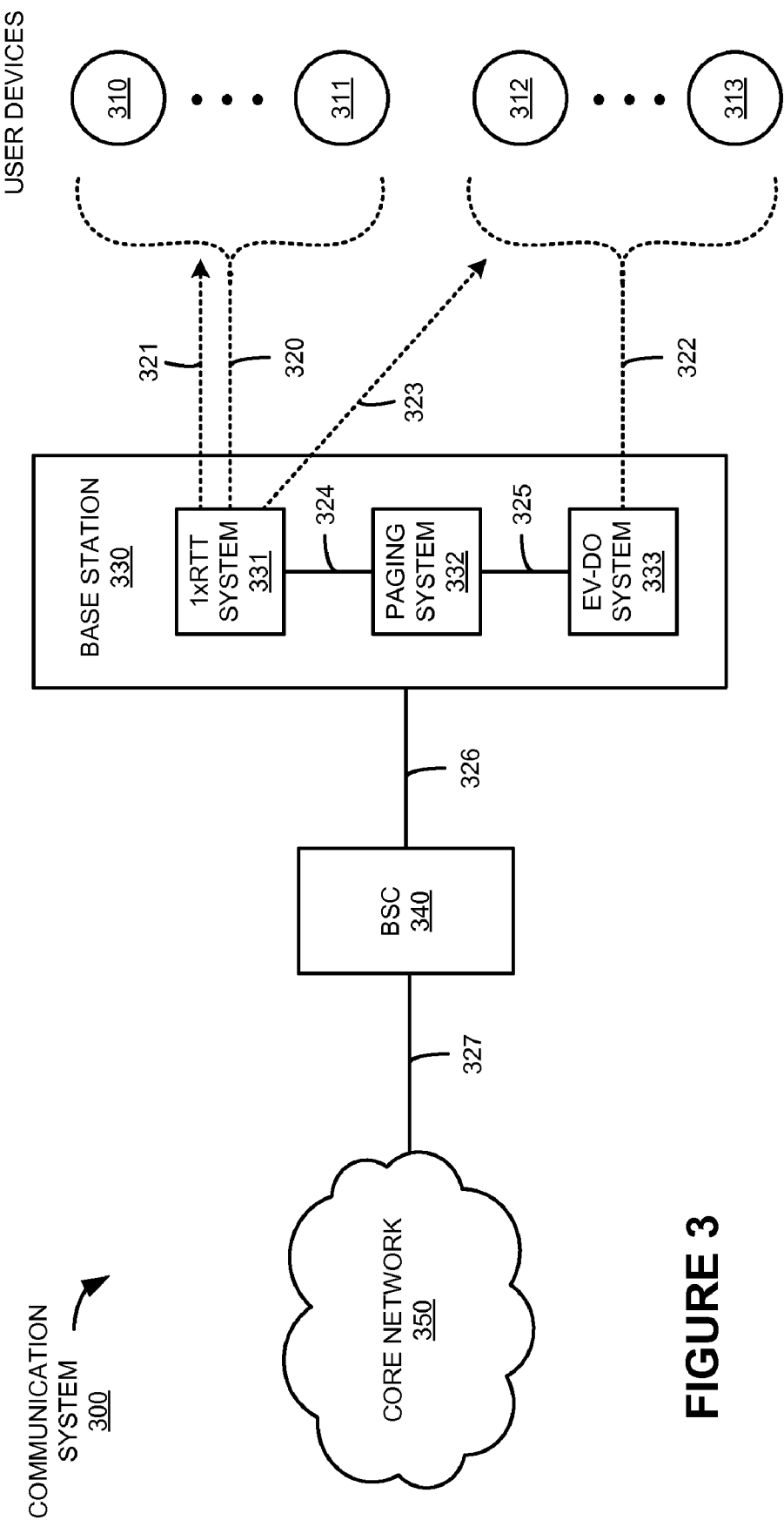
FIG. 3 is a system diagram illustrating a communication system.

FIG. 3 is a system diagram illustrating communication system 300. Communication system 300 includes user devices 310-313, base station 330, base station controller (BSC) 340, and core network 350. Base station 330 communicates with associated base station controller 340 over backhaul link 326. In this example, backhaul link 326 is a T1 link. Base station controller 340 and core network 350 communicate over link 327. In this example, link 327 is an optical networking link capable of carrying Internet protocol (IP) packets. Also in this example, user devices 310-313 are each mobile smartphones and can communicate over wireless links with base station 330. User devices 310-311 are included in a first set of user devices, and user devices 312-313 are included in a second set of user devices, as shown in FIG. 3. User devices of the first set, namely user devices 310-311, each communicate using the Code Division Multiple Access (CDMA) single-carrier radio transmission technology link (1xRTT) wireless protocol with base station 330 over 1xRTT link 320. User devices of the second set, namely user devices 312-313, each communicate using the Evolution-Data Optimized (EV-DO) wireless protocol with base station 330 over EV-DO link 322. The 1xRTT notification links 321 and 323 are shown in FIG. 3 as optional paging notification links for user devices 310-313.

Base station 330 includes 1xRTT system 331, paging system 332, and EV-DO system 333. The 1xRTT system 331 and paging system 332 communicate over link 324. EV-DO system 333 and paging system 332 communicate over link 325. The 1xRTT system 331 includes RF communication and control circuitry and antennas, as well as wireless communications equipment capable of communicating with and providing communication service and paging information to user devices using the 1xRTT communication mode. EV-DO system 333 includes RF communication and control circuitry and antennas, as well as wireless communications equipment capable of communicating with and providing communication service and paging information to user devices using the EV-DO communication mode. The 1xRTT system 331 and EV-DO system 333 can receive pages and other paging information from paging system 332. Paging system 332 includes equipment such as processing equipment, communication interfaces, and other equipment to obtain pages for delivery to any of user devices 310-313. Paging system 332 can receive pages from BSC 340 or create or modify pages for delivery to user devices 310-313. In some examples, notification of available pages are transferred through 1xRTT system 331 over 1xRTT paging notification link 321 for user devices 310-311, and over 1xRTT notification link 323 for user devices 312-313. In other examples, the notification of available pages are transferred though 1xRTT system 331 over 1xRTT link 320 for user devices 310-311, and through EV-DO system 333 over EV-DO link 322 for user devices 312-313. In further examples, the pages are transferred though 1xRTT system 331 over 1xRTT link 320 for user devices 310-311, and through EV-DO system 333 over EV-DO link 322 for user devices 312-313.

Base station controller (BSC) 340 includes equipment such as communication interfaces and processing systems for communicating with and controlling base station 330 over backhaul link 326. Base station controller 340 could also include communication equipment capable of routing communications exchanged between base station 330 and core network 350 to further systems and networks. In this example, base station 330 is operated by the same wireless service provider as base station controller 340. Core network 350 is a core network of a wireless network in this example. Core network 350 could include further base stations, routers, gateways, controller systems, processing systems, access systems, Internet systems, or other communication equipment.

Figure 4:
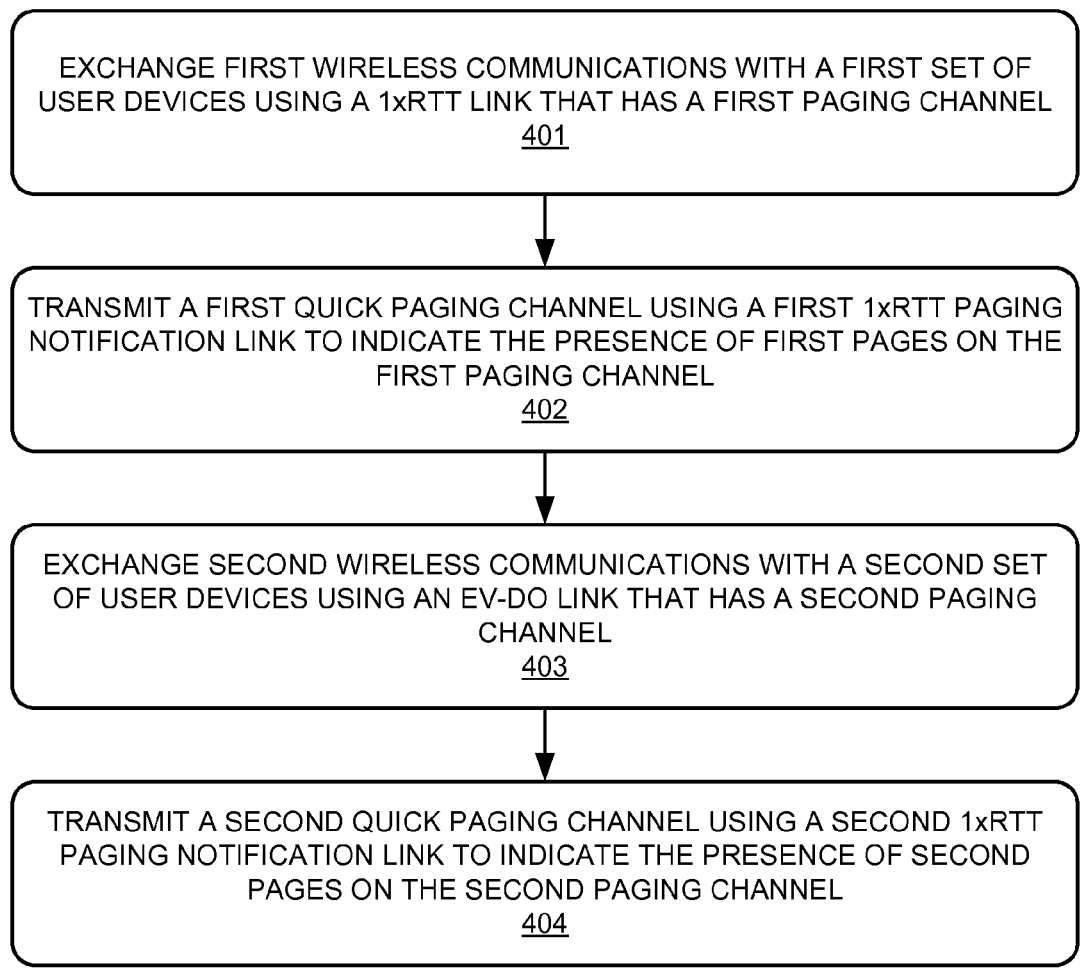
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, 1xRTT system 331 exchanges (401) wireless communications with a first set of user devices using 1xRTT link 320 that has at least one paging channel. In this example, the first set of user devices includes user devices 310-311. The paging channel of 1xRTT link 320 is included in a forward link portion of 1xRTT link 320. The paging channel of 1xRTT link 320 is used to transfer pages and other paging information to user devices 310-311. The paging information could include call alerts, text messages, audio messages, network alerts, or other information. The 1xRTT system 331 transmits (402) a first quick paging channel (QPCH) over 1xRTT paging notification link 321 to indicate the presence of first pages on the paging channel of 1xRTT link 320. The QPCH of 1xRTT paging notification link 321 does not carry actual pages in this example, and instead carries a bit sequence or flag indicators which indicate to user devices that a page is available on the paging channel of 1xRTT link 320. In this example, the first set of user devices shares an indicator, such as a bit, on the QPCH of 1xRTT paging notification link 321. For example, if a page was available for any of the first set of user devices on the paging channel of 1xRTT link 320, then the QPCH of 1xRTT paging notification link 321 includes an indicator that a page is available on the paging channel of 1xRTT link 320. In response to the indicator on the QPCH of 1xRTT paging notification link 321, all of the user devices sharing the indicator of the QPCH, i.e. the first set of user devices, monitor the paging channel of 1xRTT link 320 to determine if a page is available. Since the indicator of the QPCH is shared in this example, a page may or may not be available for all notified user devices sharing the QPCH of 1xRTT paging notification link 321.

EV-DO system 333 exchanges (403) wireless communications with a second set of user devices using EV-DO link 322 which also has at least one paging channel. In this example, the second set of user devices includes user devices 312-313. The paging channel of EV-DO link 322 is included in a forward link portion of EV-DO link 322. The paging channel of EV-DO link 322 is used to transfer pages and other paging information to user devices 312-313. The paging information could include call alerts, text messages, audio messages, network alerts, or other information. In this example, 1xRTT system 331 transmits (404) a second quick paging channel (QPCH) over 1xRTT paging notification link 323 to indicate the presence of second pages on the paging channel of EV-DO link 322. Similar to the QPCH of 1xRTT paging notification link 321, the QPCH of 1xRTT paging notification link 323 does not carry actual pages in this example, and instead carries a bit sequence or flag indicators which indicate to user devices that a page is available on the paging channel of EV-DO link 322. In this example, the second set of user devices shares an indicator, such as a bit, on the QPCH of 1xRTT paging notification link 323. For example, if a page was available for any of the second set of user devices on the paging channel of EV-DO link 322, then the QPCH of 1xRTT paging notification link 323 includes an indicator that the page is available on the paging channel of EV-DO link 322. In response to the indicator on the QPCH of 1xRTT paging notification link 323, all of the user devices sharing the indicator of the QPCH, i.e. the second set of user devices, monitor the paging channel of EV-DO link 322 to determine if a page is available. Since the indicator of the QPCH is shared in this example, a page may or may not be available for all notified user devices sharing the QPCH of 1xRTT paging notification link 323.

Figure 5:
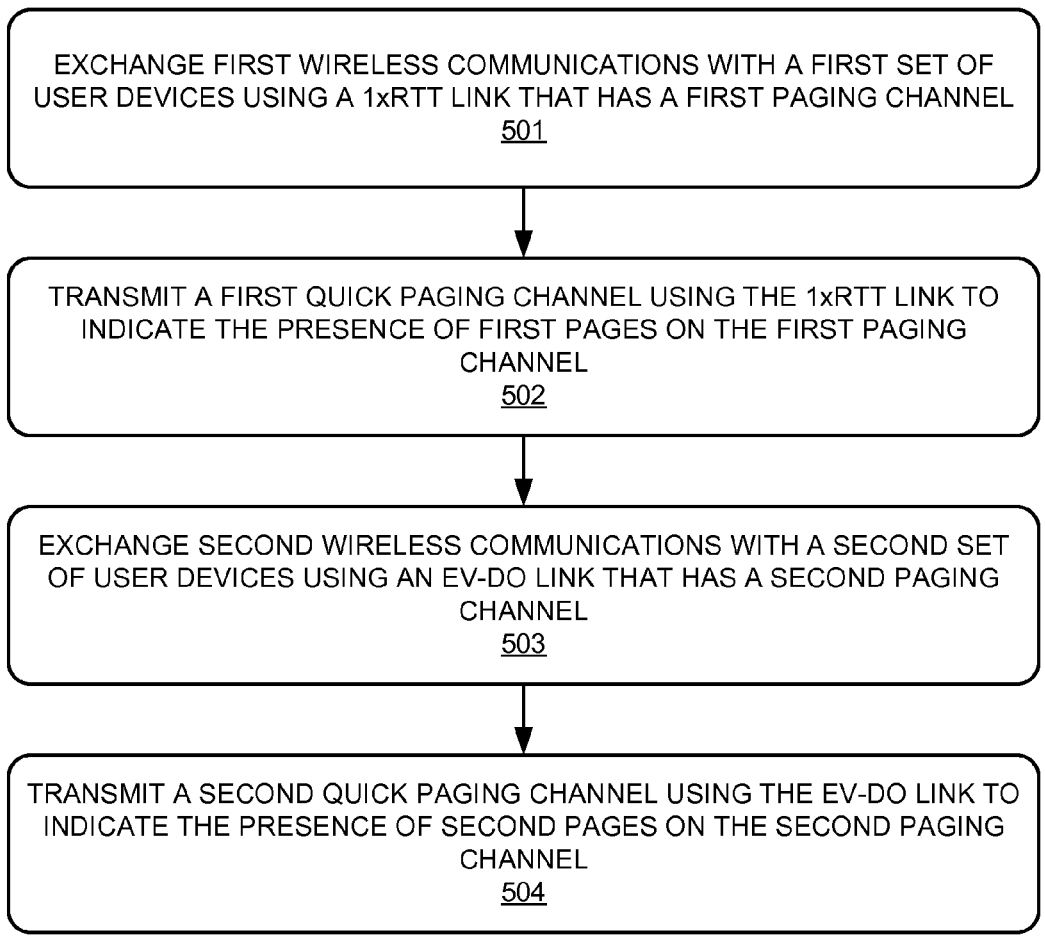
FIG. 5 is a flow diagram illustrating a method of operation of a communication system.

FIG. 5 is a flow diagram illustrating a method of operation of communication system 300. The operations of FIG. 5 are referenced herein parenthetically. FIG. 5 describes an example operation of communication system 300 without the use of optional 1xRTT paging notification links 321 and 323. In FIG. 5, 1xRTT system 331 exchanges (501) wireless communications with a first set of user devices using 1xRTT link 320 that has at least one paging channel. In this example, the first set of user devices includes user devices 310-311. The paging channel of 1xRTT link 320 is included in a forward link portion of 1xRTT link 320. The paging channel of 1xRTT link 320 is used to transfer pages and other paging information to user devices 310-311. In this example, 1xRTT system 331 also transmits (502) a quick paging channel (QPCH) over 1xRTT link 320 to indicate the presence of first pages on the paging channel of 1xRTT link 320. The QPCH of 1xRTT link 320 does not carry actual pages in this example, and instead carries a bit sequence or flag indicators which indicate a page is available on the paging channel of 1xRTT link 320. In this example, the first set of user devices shares an indicator, such as a bit, on the QPCH of 1xRTT link 320. For example, if a page was available for any of the first set of user devices on the paging channel of 1xRTT link 320, then the QPCH of 1xRTT link 320 includes an indicator that the page is available on the paging channel of 1xRTT link 320. In response to the indicator on the QPCH of 1xRTT link 320, all of the user devices sharing the indicator of the QPCH, i.e. the first set of user devices, monitor the paging channel of 1xRTT link 320 to determine if a page is available. Since the indicator of the QPCH is shared in this example, a page may or may not be available for all notified user devices sharing the QPCH of 1xRTT link 320.

EV-DO system 333 exchanges (503) wireless communications with a second set of user devices using EV-DO link 322 which also has at least one paging channel. In this example, the second set of user devices includes user devices 312-313. The paging channel of EV-DO link 322 is included in a forward link portion of EV-DO link 322. The paging channel of EV-DO link 322 is used to transfer pages and other paging information to user devices 312-313. In this example, EV-DO system 333 also transmits (504) a quick paging channel (QPCH) over EV-DO link 322 to indicate the presence of second pages on the paging channel of EV-DO link 322. Similar to the QPCH of 1xRTT link 320, the QPCH of EV-DO link 322 does not carry actual pages in this example, and instead carries a bit sequence or flag indicators which indicate a page is available on the paging channel of EV-DO link 322. In this example, the second set of user devices shares an indicator, such as a bit, on the QPCH of EV-DO link 322. For example, if a page was available for any of the second set of user devices on the paging channel of EV-DO link 322, then the QPCH of EV-DO link 322 includes an indicator that the page is available on the paging channel of EV-DO link 322. In response to the indicator on the QPCH of EV-DO link 322, all of the user devices sharing the indicator of the QPCH, i.e. the second set of user devices, monitor the paging channel of EV-DO link 322 to determine if a page is available. Since the indicator of the QPCH is shared in this example, a page may or may not be available for all notified user devices sharing the QPCH of EV-DO link 322.

When a shared paging indicator notifies that a page is available for members of the set of user devices, each of the user devices of the set typically interrupt normal operation to check the paging channel to see for which user device the page is available. Since the paging indicator is shared, a page may or may not be available for every notified user device of the set. Dual or multi-mode user devices using different communication modes or protocols than that of the paging indicator link and/or paging channel would have to switch communication modes for a period of time to check the shared paging indicator. If the shared paging indicator notifies that a page is available for some member of the set of user devices that share the paging indicator, then all the user devices of the set would need to interrupt normal operation, such as user communications, to check for which user device the page is available. It should be understood that a paging indicator, such as a bit on a QPCH, could represent that pages are available for more than one of the user devices sharing the paging indicator.

In many examples, the sets of user devices are determined based upon the communication mode or communication protocol of each user device. For example, user devices operating in a first communication mode may be grouped into a first set of user devices and share an indicator on a first QPCH associated with their respective first communication mode. Likewise, user devices operating in a second communication mode may be grouped into a second set of user devices and share an indicator on a second QPCH associated with their respective second communication mode. In some examples, a single QPCH could be used, while user devices operating in similar communication modes share separate indicators on the single QPCH. In further examples, the set of user devices could be determined based on an application type of the wireless communications, such as data communications, voice calls, voice over IP (VoIP), or other applications types. In yet further examples, the set of user devices could be determined based on a geographic location, on a usage level, or a version of a communication protocol used, among other considerations.

The individual paging channels, paging notification links, or quick paging channels (QPCH) could operate using different associated spreading codes. Spreading codes typically comprise random or pseudo-random sequences, such as Walsh codes, to spread radio frequency (RF) energy in a random or pseudo-random fashion to logically separate one communication portion from another. In yet further examples, individual paging channels or quick paging channels could have separate frequencies associated therewith, such as carrier frequencies, modulation frequencies, channel frequencies, or other frequency-dependent separation. In yet further examples, different timeslots could be used to distinguish the individual paging portions of a paging channel, or to distinguish paging channels or quick paging channels. It should be understood that a combination of timeslots, frequencies, or spreading codes, among other techniques, could be used.

Figure 6:
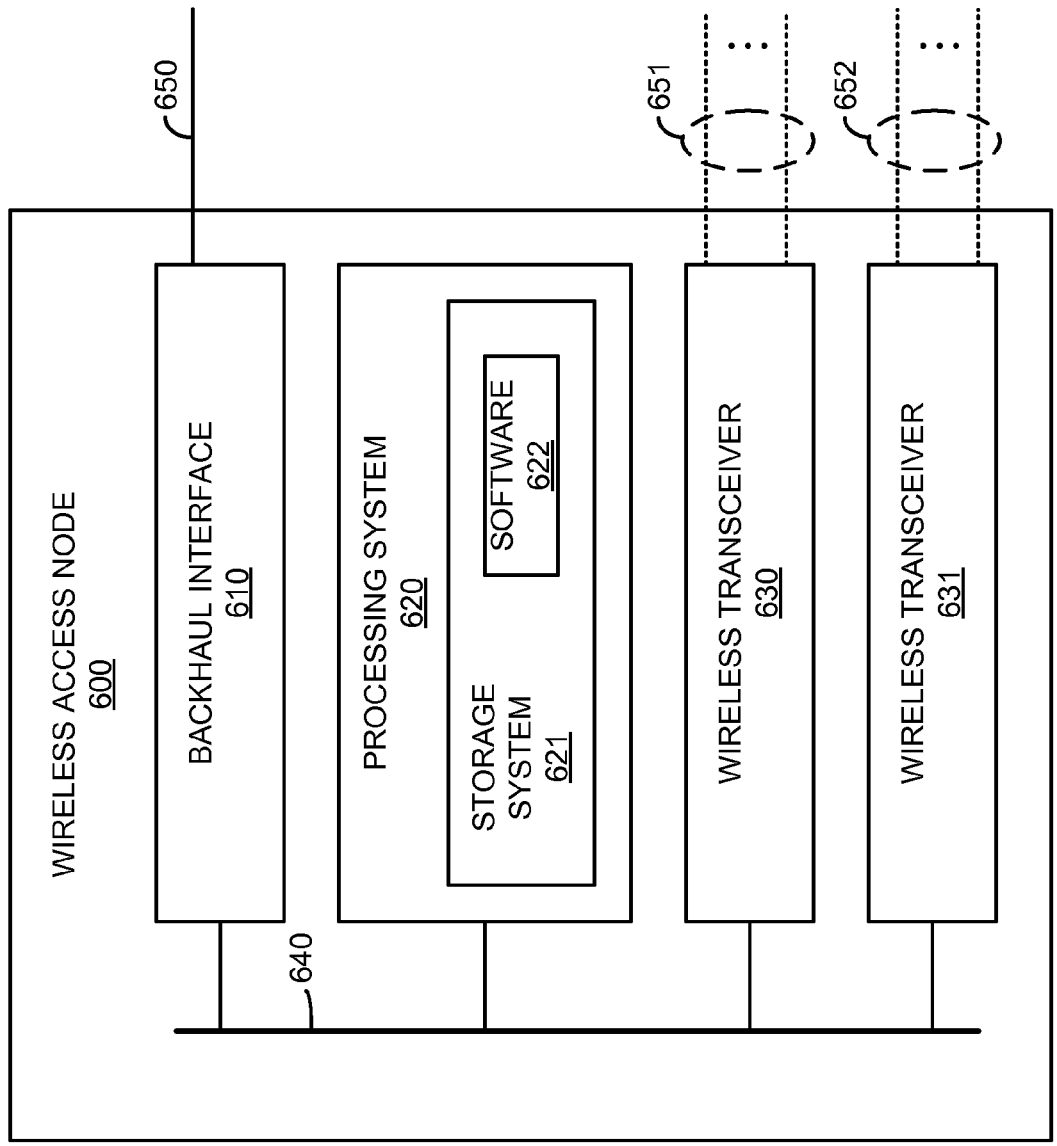
FIG. 6 is a block diagram illustrating a wireless access node.

FIG. 6 is a block diagram illustrating wireless access node 600, as an example of wireless access node 130 found in FIG. 1 or base station 330 found in FIG. 3, although wireless access node 130 or base station 330 could use other configurations. Wireless access node 600 includes backhaul interface 610, processing system 620, and wireless transceivers 630-631. Backhaul interface 610, processing system 620, and wireless transceivers 630-631 communicate over bus 640. Wireless access node 600 may be distributed among multiple devices that together form elements 610, 620-622, 630-631, 640, and 650-652.

Backhaul interface 610 comprises network router and gateway equipment for communicating with a network of a wireless communication provider, such as with a wireless network control system, base station controller, or other wireless access system. Backhaul interface 610 exchanges user communications and overhead communications with a wireless network control system or other wireless access system of a wireless communication system, omitted for clarity, over link 650. In some examples, backhaul interface 610 receives pages over link 650 for delivery to user devices. Link 650 could use various protocols or communication formats as described herein for links 122, 325, or 326, including combinations, variations, or improvements thereof.

Processing system 620 includes storage system 621. Processing system 620 retrieves and executes software 622 from storage system 621. In some examples, processing system 620 is located within the same equipment in which backhaul interface 610 or wireless transceivers 630-631 are located. In further examples, processing system 620 comprises specialized circuitry, and software 622 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as provide wireless access to user devices, route communications between user devices and a wireless network control system, receive pages for delivery to user devices, and determine paging channels and paging notifications for user devices.

Wireless transceivers 630-631 each comprises communication interfaces for communicating with user devices. Wireless transceivers 630-631 could each include transceiver equipment and antenna elements for wirelessly exchanging user communications and overhead communications, such as pages, with user devices in a wireless communication system, omitted for clarity, over the associated wireless links 651-652. In some examples, two or more of the associated wireless links 651-652 are used to communicate with a single user device or set of user devices. Wireless transceivers 630-631 also each receives command and control information and instructions from processing system 620 or backhaul interface 610 for controlling the operations of user devices over the associated wireless links 651-652, coordinating handoffs of user devices between other wireless access nodes or base stations, providing paging channels, transmitting notifications to indicate the presence of pages on the paging channels, and transferring pages for delivery to user devices. Wireless inks 651-652 could each use various protocols or communication formats as described herein for wireless links 120-121 or 320-323, including combinations, variations, or improvements thereof. In some examples, transceivers 630-631 each operate in a different communication mode, and provide wireless access to communication services over the respective communication mode over the associated wireless links 651-652.

Bus 640 comprises a physical, logical, or virtual communication link, capable of communicating data, control signals, and communications, along with other information. In some examples, bus 640 is encapsulated within the elements of backhaul interface 610, processing system 620, or wireless transceivers 630-631, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, user devices 110-113 each comprise radio frequency (RF) communication circuitry and antenna elements. The RF communication circuitry typically includes amplifiers, filters, modulators, and signal processing circuitry. In many examples, user devices 110-113 each include circuitry and equipment to exchange communications of multiple wireless communication services over multiple wireless links, or with multiple base stations. User devices 110-113 may each also include user interface systems, memory devices, computer-readable storage mediums, software, processing circuitry, or some other communication components. User devices 110-113 each may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof. Although four user devices are shown in FIG. 1, it should be understood that a different number of user devices could be shown.

Wireless access node 130 comprises RF communication and control circuitry, antenna elements, and communication routing equipment and systems. The RF communication circuitry typically includes amplifiers, filters, RF modulators, transceivers, and signal processing circuitry. In many examples, wireless access node 130 includes equipment to provide wireless access and communication services over different communication modes to groups of user devices, such as the first and second sets of user devices shown in FIG. 1, as well as route communications between core network 150 and user devices 110-113, provide providing paging channels, transmit notifications to indicate the presence of pages on the paging channels, and transfer pages for delivery to user devices 110-113. Wireless access node 130 may also comprise data modems, routers, servers, memory devices, software, processing circuitry, cabling, network communication interfaces, physical structural supports, or other communication apparatuses. Wireless access node 130 may also comprise base stations, base transceiver stations, base station controllers (BSC), mobile switching centers (MSC), radio node controllers (RNC), or other communication equipment and apparatuses.

Core network 150 could include further wireless access nodes, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 150 may also comprise optical networks, asynchronous transfer mode (ATM) networks, packet networks, metropolitan-area networks (MAN), or other network topologies, equipment, or systems, including combinations thereof. In typical examples, core network 150 includes many wireless access nodes and associated equipment for providing communication services to many user devices across a geographic region.

Wireless links 120-121 each use the air or space as the transport media. Wireless links 120-121 may each use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although two wireless links 120-121 are shown in FIG. 1, it should be understood that these separate wireless links are merely illustrative to show two communication modes or wireless access pathways for sets of user devices 110-113. In other examples, a multiple wireless links could be shown, with portions of the multiple wireless links shared between user devices 110-113 and used for different communication sessions and associated paging or overhead communications.

Communication link 122 uses metal, glass, optical, air, space, or some other material as the transport media. Communication link 122 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 122 could be a direct links or may include intermediate networks, systems, or devices.

Links 120-122 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless links 120-121 as transmitted by the associated ones of user devices 110-113 is referred to an uplink or reverse link of the wireless link, while the portion as transmitted by wireless access node 130 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node in a communication system, the method comprising:
grouping a first set of user devices currently using a first communication mode to share a first paging indicator which indicates first pages on a first paging channel of the first communication mode;
grouping a second set of user devices currently using a second communication mode to share a second paging indicator which indicates second pages on a second paging channel of the second communication mode;
exchanging first wireless communications with the first set of user devices using the first communication mode, wherein the first communication mode uses a first wireless communication protocol and comprises the first paging indicator, the second paging indicator, and the first paging channel;
exchanging second wireless communications with the second set of user devices using the second communication mode, wherein the second communication mode uses a second wireless communication protocol and comprises the second paging channel;
transmitting the first paging indicator using the first communication mode to indicate presence of the first pages on the first paging channel of the first communication mode; and
transmitting the second paging indicator using the first communication mode to indicate presence of the second pages on the second paging channel of the second communication mode.

2. The method of claim 1, wherein the first paging indicator and the second paging indicator are each provided over separate quick paging channels.

3. The method of claim 2, wherein the separate quick paging channels are each provided using different spreading codes.

4. The method of claim 1, wherein the first paging indicator and the second paging indicator are each provided over separate quick paging frequencies.

5. The method of claim 1, wherein the first communication mode comprises a first wireless link using a Code Division Multiple Access single-carrier radio transmission technology link (1xRTT) wireless protocol, and wherein the second communication mode comprises a second wireless link using a Evolution-Data Optimized (EV-DO) wireless protocol.

6. The method of claim 5, wherein the first paging indicator is provided over a first quick paging channel using the 1xRTT protocol, and wherein the second paging indicator is provided over a second quick paging channel using the 1xRTT protocol.

7. The method of claim 1, wherein the first paging indicator comprises a first bit sequence provided over a first quick paging channel, and wherein the second paging indicator comprises a second bit sequence provided over the first quick paging channel.

8. The method of claim 6, wherein the first quick paging channel and the second quick paging channel are each provided using different spreading codes.

9. The method of claim 1, wherein the first set of user devices receive wireless access and the first paging indicator from a first transceiver of the wireless access node, and wherein the second set of user devices receive wireless access from a second transceiver of the wireless access node and receive the second paging indicator from the first wireless transceiver of the wireless access node.

10. A wireless access node in a communication system, the wireless access node comprising:
a paging system configured to group a first set of user devices currently using a first communication mode to share a first paging indicator which indicates first pages on a first paging channel of the first communication mode;
the paging system configured to group a second set of user devices currently using a second communication mode to share a second paging indicator which indicates second pages on a second paging channel of the second communication mode;
a first communication interface configured to exchange first wireless communications with the first set of user devices using the first communication mode, wherein the first communication mode uses a first wireless communication protocol and comprises the first paging indicator, the second paging indicator, and the first paging channel;
a second communication interface configured to exchange second wireless communication with the second set of user devices using the second communication mode, wherein the second communication mode uses a second wireless communication protocol and comprises the second paging channel;
the first communication interface configured to transmit the first paging indicator using the first communication mode to indicate presence of first pages on the first paging channel of the first communication mode; and
the first communication interface configured to transmit the second paging indicator using the first communication mode to indicate presence of second pages on the second paging channel of the second communication mode.

11. The wireless access node of claim 10, wherein the first communication interface is configured to provide the first paging indicator over a first quick paging channel and the second paging indicator over a second quick paging channel.

12. The wireless access node of claim 11, wherein the first quick paging channel and second quick paging channel are each provided using different spreading codes.

13. The wireless access node of claim 10, wherein the first communication interface is configured to provide the first paging indicator over a first quick paging frequency and the second paging indicator over a second quick paging frequency.

14. The wireless access node of claim 10, wherein the first communication mode comprises a first wireless link using a Code Division Multiple Access single-carrier radio transmission technology link (1xRTT) wireless protocol, and wherein the second communication mode comprises a second wireless link using a Evolution-Data Optimized (EV-DO) wireless protocol.

15. The wireless access node of claim 14, wherein the first communication interface is configured to provide the first paging indicator over a first quick paging channel using the 1xRTT protocol, and wherein the first communication interface is configured to provide the second paging indicator over a second quick paging channel using the 1xRTT protocol.

16. The wireless access node of claim 10, wherein the first paging indicator comprises a first bit sequence provided over a first quick paging channel, and wherein the second paging indicator comprises a second bit sequence provided over the first quick paging channel.

17. The wireless access node of claim 15, wherein the first quick paging channel and the second quick paging channel are each provided using different spreading codes.

18. The wireless access node of claim 10, wherein the first set of user devices receive wireless access and the first paging indicator from a first transceiver of the wireless access node, and wherein the second set of user devices receive wireless access from a second transceiver of the wireless access node and receive the second paging indicator from the first wireless transceiver of the wireless access node.

* * * * *